great clinical value, being widely used in medical practice for the prevention of habitual or threatened abortion, the treatment of dysmenorrhoea, pre-menstrual tension, as ovulation-suppressing agents and other sex cyclic regulatory purposes.

United States Patent Office 3,101,351
Patented Aug. 20, 1963

3,101,351
DIALKYL PROGESTERONES AND PROCESS THEREFOR
Robert P. Graber and Martin B. Meyers, Minneapolis, Minn., assignors to General Mills, Inc., a corporation of Delaware
No Drawing. Filed Sept. 29, 1960, Ser. No. 59,198
5 Claims. (Cl. 260—397.4)

This invention relates to the group of substances known as sex hormones and members of the progestational group of hormones, and in particular to the dialkyl progesterones, methods used in the preparation thereof and novel intermediates therefor. Such progestational hormones have as their basic structure the perhydrocyclopentanophenanthrene ring system and are then members of the steroid class of sex hormones.

This general class of substances contains members of great clinical value, being widely used in medical practice for the prevention of habitual or threatened abortion, the treatment of dysmenorrhoea, pre-menstrual tension, as ovulation-suppressing agents and other sex cyclic regulatory purposes.

In addition to their usefulness in themselves as hormonal substances they may be expected to be of great value for the chemical and/or microbiological conversion of members of this group to the anti-inflammatory corticoid hormones, for example by the introduction of oxygen into position 11 of the molecule and appropriate modification of the side-chain, with or without the addition of other substituent groups other than those disclosed in the present invention and with or without the introduction of further unsaturation in the molecule.

The end products of the present invention may be represented by the following formula:

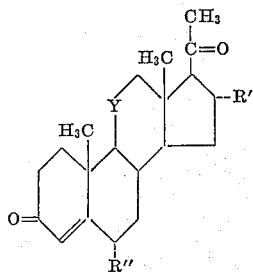

where R' and R'' are lower alkyl groups having from 1 to 8 carbon atoms, and Y is selected from the group consisting of

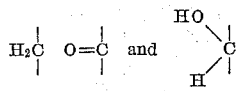

As will be apparent from the description to follow R' and R'' may be the same or may be different alkyl groups.

The novel compounds and processes may be represented by the following reaction schemes:

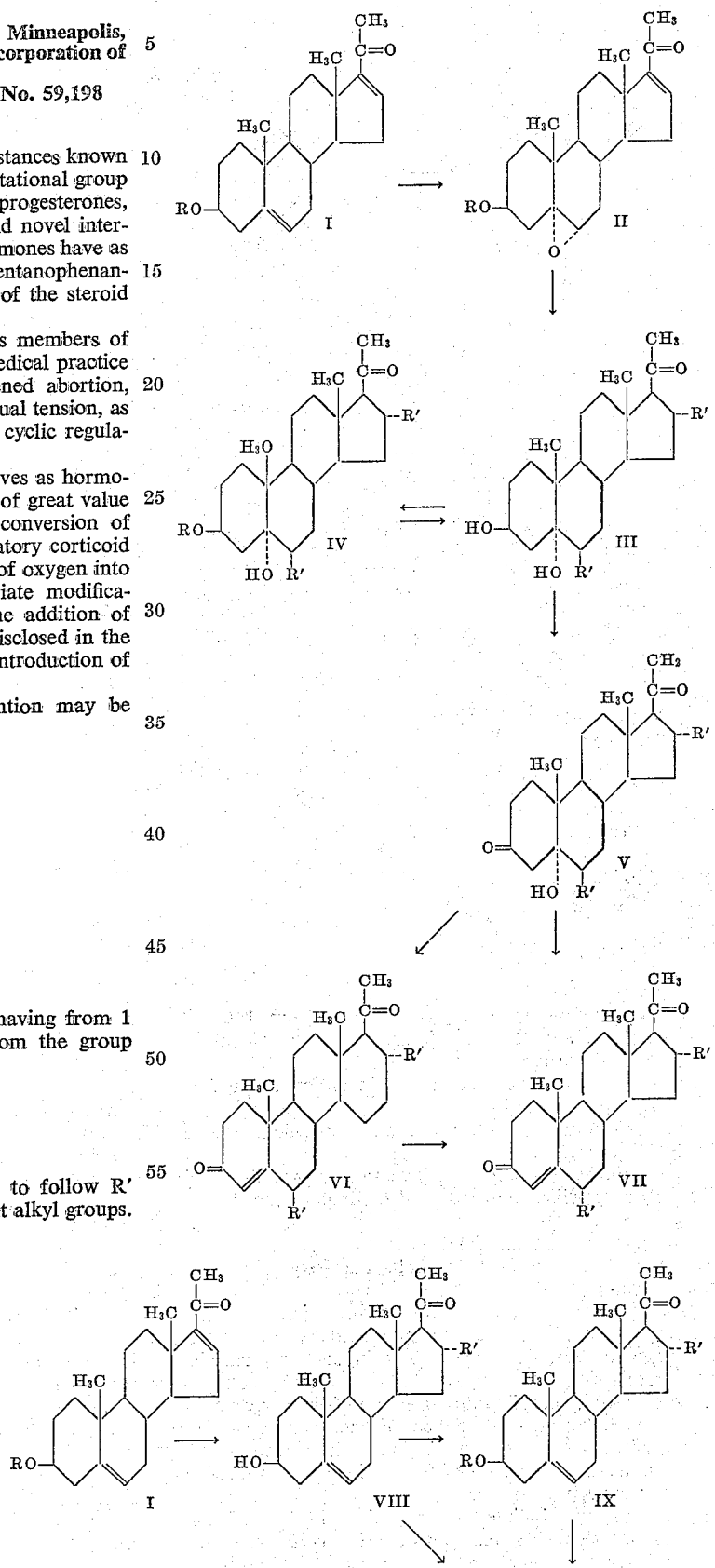

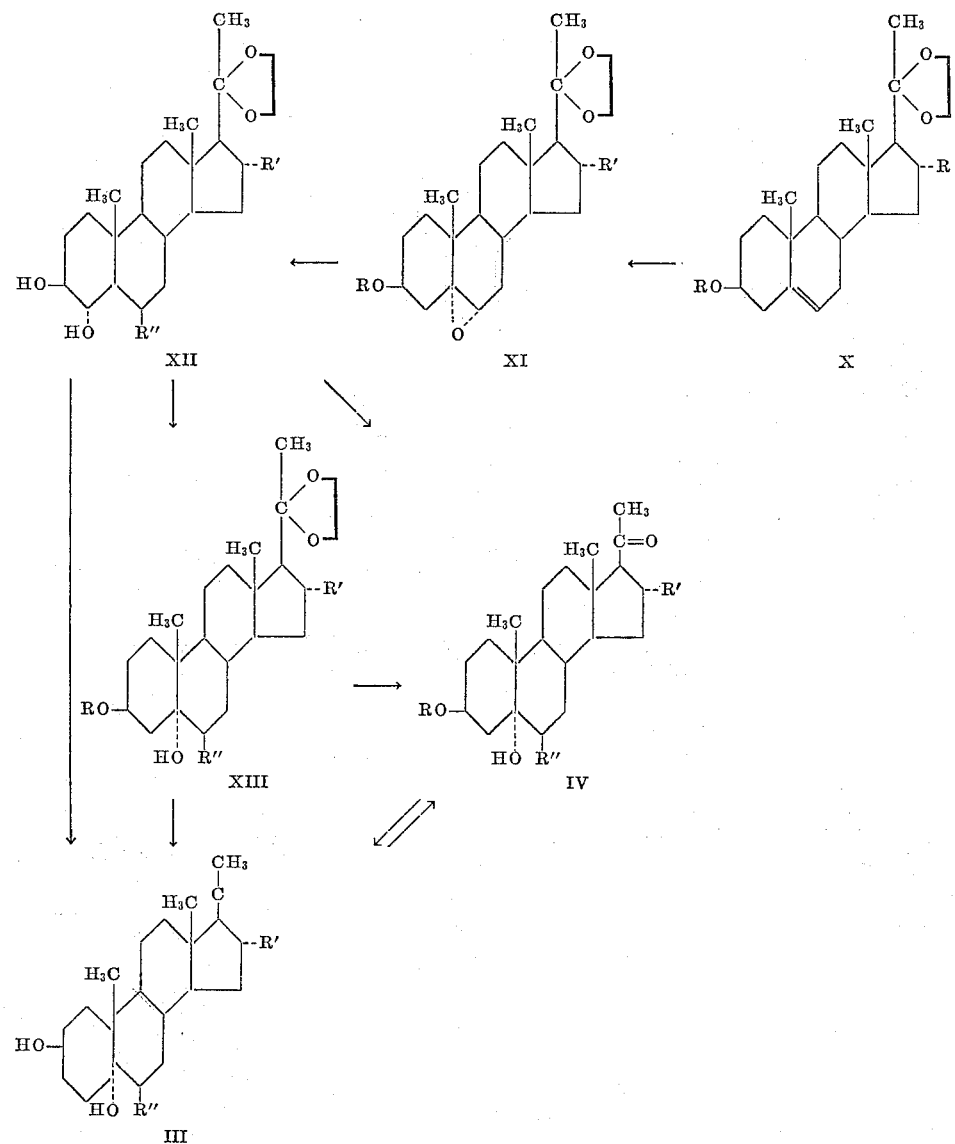

where R is H or an acyl group having from 1 to 12 carbon atoms and R' and R" are alkyl groups having from 1 to 8 carbon atoms.

It is therefore an object of this invention to provide dialkyl progesterones.

It is also an object of this invention to provide a method of preparing dialkyl progesterones.

It is a further object of this invention to provide novel intermediates which may be used to prepare the dialkyl progesterones.

The starting materials for the present invention are the readily available steroids, the 3 beta-acyloxy-delta 5,16-pregnadien-20-ones.

One of the processes of the present invention comprises treating the starting material represented by Formula I, by known methods with organic peracids such as peracetic, perbenzoic, monoperthalic and the like, thereby converting the starting material into a mixture of the corresponding 5 alpha, 6 alpha- and 5 beta, 6 beta-mono-epoxides. From this mixture the desired alpha-oxirane compound, Formula II, may be separated by fractional crystallization or other conventional means.

Simultaneous di-alkylation may then be carried out on the unsaturated mono-epoxide (II) by the use, for example, of alkyl metal halides in appropriate solvents, preferably in the presence of metal halide catalysts to produce 3 beta, 5 alpha-dihydroxy-6 beta, 16 alpha-dialkyl-pregnan-20-ones (III). These compounds may be obtained directly in this manner, or if preferred, the crude reaction products may be acylated producing the corresponding 3-acylates (IV), as in Example I. Compounds of type IV are readily re-converted, if desired, for example, by treatment with perchloric acid in methanol, or for example, sodium hydroxide in aqueous alcohol, to compounds of type III.

In the dialkylation reaction of compound II to compound III the alkylating agents employed may be the alkyl metal halides such as those having the formula RMgX where R is an alkyl group having from 1 to 8 carbon atoms and X is a halogen atom. The alkylation is carried out in appropriate solvents, illustrative thereof being high boiling (180° C. or less), aromatic hydrocarbons, such as, benzene, toluene, xylene (ortho, meta, para), or an ether such as anisole, di-n-butyl-ether, diisobutyl ether, etc., and mixtures. Preferably a metal halide catalyst is also employed such as cuprous chloride or nickel chloride, the cuprous chloride being preferred. The crude reaction products may be acylated through the use of acid anhydrides such as acetic anhydride or other fatty acid anhydrides to compound IV which may be re-converted to compound III by treatment with perchloric acid, hydrochloric acid, or alkalis such as sodium hydroxide, etc., or in alcohols, preferrably alkyl alcohols such as methanol and ethanol.

The thus obtained dialkyl-diolones may then be oxidized by conventional procedures to the corresponding 3-ketones (V). Illustrative of the oxidizing agents are sodium dichromate, chromium trioxide, sodium chromate. An acetic acid solution may be employed as well as other acid solutions such as propionic acid; non-acid solutions, such as aqueous acetone and anhydrous or aqueous pyridine, may also be used. Dehydration with introduction of an ethylenic linkage between carbon atoms 3 and 4 may then be carried out. Depeding on the reaction conditions employed, there may be produced 6 beta, 16 alpha-dialkyl progesterones, for example by suitable elimination conditions using pyridine and thionyl chloride, giving rise to a series of compounds of type VI. More vigorous acidic conditions as for example hydrochloric acid in alcohols as well as alkaline conditions such as sodium hydroxide in alcohols, effect elimination and epimerization, whereby 6 alpha, 16 alpha-dialkyl progesterones (VII) are obtained. Conversion of the 6 beta-isomer to the 6 alpha-isomer may be achieved if desired with these same basic or acidic conditions.

The preparation of compound IV from starting material I may also be accomplished in a stepwise fashion by a somewhat different route. This route has the advantage that different alkyl groups may be introduced at 6 and 16. Compound IV may then be converted to the dialkyl progresterone in the manner described above.

In following the alternate route to compounds of the Formula IV, compound I may be monoalkylated to provide compounds of Formula VIII using the same agents as previously described for the dialkylation without prior formation of the oxido compound of Formula II. The hydroxyl group at position 3 may be acylated in the same manner as the previously described acylation, if desired to provide compounds of Formula IX.

The ketonic function present in the side chain at carbon atom 20 is then protected by conventional ketalization procedures to provide compounds of Formula X. Illustrative of such ketalization is the use of ethylene glycol, or other alkylene glycols in which the alkylene radical has from 2 to 5 carbon atoms, a benzene system and p-toluenesulfonic acid monohydrate. Peracid oxidation with acids such as peracetic acid followed by fractional crystallization produces the alkyl oxido compound represented by Formula XI. Grignard alkylation generates the ketal compound represented by Formula XII. In this instance, the Grignard alkylation is conducted in a solution of tetrahydrofuran. The other solvent systems previously described may be employed.

Reacylation in the manner previously described then results in the simultaneous production of XIII and IV. Conversion of XIII to IV is readily accomplished with the use of a strong acid in alcohol such as sulfuric acid and methanol. This acid treatment could alternatively be used on compound XII to remove the ketal group with subsequent acylation to compound IV or used on compound XIII to remove the ketal and acyloxy group to provide compound III which upon subsequent acylation provides compound IV The following examples are illustrative of the process and products of the present invention but are not to be construed as limiting the invention.

Example I

To a refluxing stirred mixture of 135 ml. of a 3 molar ethereal solution of methyl magnesium bromide and 0.8 g. of cuprous chloride, there was added in 30 minutes a solution of 5.0 g. of 5 alpha, 6 alpha-oxido-16-pregnen-3 beta-ol-20-one acetate in 250 ml. of toluene. After stirring under reflux for an additional 90 minutes, the reaction mixture was cooled and hydrolyzed with 150 ml. of saturated aqueous ammonium chloride solution. The upper layer was separated and shaken with an additional 500 ml. of saturated ammonium chloride solution, then washed once with water and finally with saturated aqueous sodium chloride solution. After drying over anhydrous magnesium sulfate, the solvent was evaporated to give 5.17 g. of amorphous solid which was taken up in 60 ml. of pyridine. Five ml. of acetic anhydride was added and after standing 66 hours the mixture was poured into water and extracted with chloroform. The lower layer was separated and washed once with dilute sulfuric acid, once with water and once with 5% aqueous sodium bicarbonate solution. After drying over anhydrous magnesium sulfate, the solvent was evaporated to yield 5.38 g. of amorphous solid which was triturated with 35 ml. of hot methanol. Filtration afforded 1.89 g. of 6 beta, 16 alpha-dimethylpregnan-3 beta, 5 alpha-diol-20-one 3-acetate melting at about 238–249°. Recrystallization from acetone-methylene chloride mixtures raised the M.P. to 243.5–248°, $[\alpha]_D^{26°} = +23.7°$ (CHCl$_3$).

*Analysis.*—Calculated for C$_{25}$H$_{40}$O$_4$: C, 74.21; H, 9.97. Found: C, 74.05; H, 9.85.

Example II

To a solution of 3 ml. of 70% perchloric acid in 150 ml. of methanol, there was added 1.32 g. of 6 beta, 16 alpha-dimethylpregnan-3 beta, 5 alpha-diol-20-one 3-acetate. After stirring for 18 hours at room temperature the steroid had completely disolved and after filtering to remove suspended matter, the solution was poured into 300 ml. of water. The suspension was filtered and the solid washed thoroughly with 2:1 water:methanol. After drying 1.02 g. of 6 beta, 16 alpha-dimethylpregnan-3 beta, 5 alpha-diol-20-one was obtained which melted at about 160–165°. Recrystallization from acetone-petroleum ether mixtures raised the M.P. to 205–209°, $$[\alpha]_D^{24°} = +37.6° \text{ (CHCl}_3\text{)}$$

*Analysis.*—Calculated for C$_{23}$H$_{38}$O$_3$: C, 76.19; H, 10.57. Found: C, 76.02; H, 10.45.

Example III

To a solution of 0.84 g. of 6 beta, 16 alpha-dimethylpregnan-3 beta, 5 alpha-diol-20-one in 20 ml. of glacial acetic acid, there was added in 5 minutes a solution of 0.5 g. of sodium dichromate dihydrate in 20 ml. of glacial acetic acid. After standing for 19 hours at room temperature, a precipitate had formed. The suspension was filtered and the solid washed with methanol. After drying there was obtained 0.45 g. of 6 beta, 16 alpha-dimethylpregnan-5 alpha-ol-3,20-dione melting at about 227–238°. Recrystallization from methanol-methylene chloride mixtures raised the M.P. to 257–260.5°, $[\alpha]_D^{25°} = +56.4°$ (CHCl$_3$).

*Analysis.*—Calculated for C$_{23}$H$_{36}$O$_3$: C, 76.62; H, 10.07. Found: C, 76.81; H, 10.30.

Example IV

A solution of 0.58 g. of 6 beta, 16 alpha-dimethylpregnan-5 alpha-ol-3,20-dione in 10 ml. of pyridine was cooled to 0° and 0.5 ml. of thionyl chloride was added with swirling. After standing for 20 minutes at 0°, water was added and the resulting precipitate removed by filtration and washed with water. Drying gave 6 beta, 16 alpha-dimethylprogesterone melting at about 151–159°. Recrystallization from acetone-petroleum ether mixtures Recrystallization from acetone-petroleum ether mixtures raised the M.P. to 157.5–161°, $[\alpha]_D^{25°} = +113.4°$ (CHCl$_3$), $$\lambda_{max.}^{EtOH} \ 242 \ m\mu, \ \epsilon = 16,300$$

*Analysis.*—Calculated for C$_{23}$H$_{34}$O$_2$: C, 80.65; H, 10.01. Found: C, 80.46; H, 10.10.

Example V

To a solution of 0.84 g. of 6 beta, 16 alpha-dimethylpregnan-5 alpha-ol-3,20-dione in 100 ml. of absolute ethanol, there was added 0.5 ml. of concentrated hydrochloric acid. The mixture was heated under reflux for 45 minutes, then 200 ml. of water was slowly added and the mixture allowed to stand at 6° for 22 hours. Filtration afforded 0.70 g. of a solid which on recrystallization from acetone-petroleum ether mixtures produced 6 alpha, 16 alpha-dimethylprogesterone melting at about 122–126°, $[\alpha]_D^{24°}=+144.2°$ (CHCl$_3$), $$\lambda_{max.}^{EtOH}\ 241\ m\mu,\ \epsilon=15,450$$

*Analysis.*—Calculated for C$_{23}$H$_{34}$O$_2$: C, 80.65; H, 10.01. Found: C, 80.47; H, 10.19.

Example VI

A 2.0 liter 3-necked round bottom flask was fitted with a stirrer, an H-tube and a Barrett type moisture receiver. The H-tube held a thermometer extending into the flask and a nitrogen inlet tube. The moisture receiver held a condenser protected from the atmosphere by a tube containing Drierite and Ascarite. The apparatus was flushed with dry nitrogen for 15 minutes to remove air and moisture.

Five hundred ml. of anhydrous tetrahydrofuran and 180 ml. of anhydrous ether were introduced into the flask followed by the rapid introduction of 70 ml. of 3 M methyl magnesium bromide. With continuous slow flushing with nitrogen, the mixture was distilled until 350 ml. of distillate had been collected by way of the moisture receiver. The temperature of the residual solution had risen to 59°. The solution was cooled in an ice bath to 20° and 1.19 g. of finely ground cuprous chloride added quickly. The trap and condenser were replaced by a dropping funnel containing a solution of 35.65 g. (0.10 mole) of 16-dehydropregnenolone acetate in 200 ml. of dry tetrahydrofuran. The dropping funnel was of the by-pass type and the neck was closed with a drying tube. With nitrogen flushing and stirring, the steroid solution was added to the Grignard solution over a period of 5 minutes maintaining the temperature between 18° and 24°. The reaction mixture was stirred and maintained at 18–21° for 30 minutes. The mixture was then cooled to 10°, and 200 ml. of saturated aqueous ammonium chloride solution added over 6 minutes.

The two-phase mixture containing much solid was further diluted with 200 ml. of 1% aqueous sodium thiosulfate which served to dissolve the solids. A 200 ml. portion of ethyl acetate was added, the mixture shaken and separated and the layers separated. The aqueous layer was further extracted with 200 ml. of 100 ml. of ethyl acetate. The combined extracts were washed successively with five portions of water and two portions of saturated aqueous salt solution. After drying over magnesium sulfate, the solvent was evaporated to give crude 16 alpha-methylpregnenolone acetate, weight 37.05 g., M.P. 163–167°, $[\alpha]_D^{34°}=-12.3°$ (CHCl$_3$).

The product was dissolved in methylene chloride, methanol added and most of the methylene chloride distilled. The slurry of crystals was cooled, filtered and the residue washed once with methanol. After drying the product weighed 27.60 g., M.P. 175–177°, $[\alpha]_D^{34°}=-9.3°$ (CHCl$_3$). A second crop of material was obtained by concentrating the mother liquors, weight 4.00 g., M.P. 163.5–171°.

Example VII

A 13.02 g. sample of 16 alpha-methylpregnenolone acetate was dissolved in a mixture of 350 ml. of benzene and 98.0 ml. of ethylene glycol. After heating under reflux for one hour about 0.2 ml. of water had collected in the Dean-Stark trap. At this point, 332 mg. of p-toluenesulfonic acid monohydrate was added and heating continued. After heating 16 hours under reflux, the reaction mixture was cooled and treated with 3.5 g. of postassium carbonate and 5.0 ml. of pyridine. During the reaction a total of 2.1 ml. of water had collected in the trap.

The reaction mixture was diluted with 200 ml. of ethyl acetate and the layers separated. The organic layer was then washed with 5% sodium bicarbonate solution, water, and saturated sodium chloride solution in the usual manner. After drying the solution over anhydrous magnesium sulfate, the solvents were removed in vacuo leaving the crude product which weighed 14.2 g. Recrystallization from methanol gave 8.57 g. of 16 alpha-methylpregnenolone acetate 20-ketal, M.P. 143–145°. Further recrystallization from methanol raised the M.P. to 146–147°, $[\alpha]_D^{25°}=-37.4$ (CHCl$_3$).

*Analysis.*—Calculated for C$_{26}$H$_{40}$O$_4$: C, 74.96; H, 9.68. Found: C, 75.06; H, 9.44.

Example VIII

To a solution of 8.32 g. of 16 alpha-methylpregnenolone acetate 20-ketal in 16.64 ml. of chloroform was added 0.83 g. of anhydrous sodium acetate. With stirring, the suspension was cooled to −2° and 8.32 ml. of commercial grade 40% peracetic acid was added over a period of 20 minutes. The reaction mixture was then stirred at a temperature between 0 and 5° for 2 hours. The reaction mixture was diluted with 100 ml. of chloroform and 50 ml. of water. The organic layer was separated and washed with 5% sodium bicarbonate solution, water and saturated sodium chloride solution. After drying the solution over anhydrous magnesium sulfate, the solvents were removed in vacuo leaving a residue weighing 8.84 g. Recrystallization from acetone-petroleum ether gave 3.61 g. of 5 alpha, 6 alpha-epoxy-16 alpha-methylpregnane-3 beta-ol-20-one 3-acetate 20-ketal, M.P. 168–171°. Further recrystallization from methanol raised the M.P. to 172–173°, $[\alpha]_D^{25°}=-62.6°$ (CHCl$_3$).

*Analysis.*—Calculated for C$_{26}$H$_{40}$O$_5$: C, 72.19; H, 9.32. Found: C, 72.21; H, 9.36.

Example IX

A 17.3 g. sample of 5 alpha, 6 alpha-epoxy-16 alpha-methylpregnan-3 beta-ol-20-one 3-acetate 20-ketal was dissolved in 350 ml. of tetrahydrofuran. To this stirred solution was added 266 ml. of a 3 M ethereal solution of methyl magnesium bromide. After adding the Grignard reagent the ether was removed by distillation. The reaction mixture was heated under reflux for 6 hours and then cooled in an ice bath. The excess Grignard reagent was decomposed by the addition of saturated ammonium chloride solution. The resulting mixture was diluted with 100 ml. of ethyl acetate and the layers separated. The organic layer was washed thoroughly with water and saturated sodium chloride solution. After drying over anhydrous magnesium sulfate the solvents were evaporated to give 16.5 g. of resinous material. This sample was crystallized from acetone-petroleum ether to give 11.45 g. of 6 beta, 16 alpha, dimethylpregnan-3 beta, 5 alpha-diol-20-one 20-ketal, M.P. 145–160°. Infrared absorption maxima determined in potassium bromide were: 2.95; 9.10, 9.30 and 9.55 microns.

Example X

An 11.19 g. sample of 6 beta, 16 alpha-dimethylpregnan-3 beta, 5 alpha-diol-20-one 20-ketal was disolved in 25.0 ml. of pyridine and treated with 25.0 ml. of acetic anhydride. After standing overnight at room temperature the reaction was diluted to about 500 ml. with water. Upon the addition of 100 ml. of ethyl acetate the gummy material crystallized. Filtration of the two-phase mixture gave 6.4 g. of 6 beta, 16 alpha-dimethylpregnan-3 beta, 5 alpha-diol-20-one 3-acetate, M.P. 238–244°. A mixed melting point with the compound prepared in Example I gave no depression. Infrared spectra of the two samples were identical.

The layers in the filtrate were separated. The ethyl acetate layer was washed with 5% sodium bicarbonate solution, water, and saturated sodium chloride solution. The ethyl acetate layer was dried and the solvent removed in vacuo to give 6.4 g. of gummy residue. Trituration with methanol provided another 1.07 g. of 6 beta, 16 alpha-dimethylpregnan-3 beta, 5 alpha-diol-20-one 3-acetate, M.P. 241–243°.

The remaining partially hydrolyzed material was taken up in 105 ml. of methanol containing 0.8% sulfuric acid. The mixture was heated under reflux for 40 minutes and then cooled to about 5°. The solid which separated was removed by filtration and after drying gave an additional 1.23 g. of 6 beta, 16 alpha-dimethylpregnan-3 beta, 5 alpha-diol-20-one 3-acetate, M.P. 230–235°.

The various products in the examples having $H_2$ in the 11-position may be converted to the 11-oxygenated substances by microbiological hydroxylation techniques such as by fermentation with 11-hydroxylating strains followed, if desired, by chemical oxidation to the ketone group.

It is to be understood that the invention is not to be limited to the exact details of operation or the exact compounds shown and described, as obvious modifications and equivalents will be apparent to one skilled in the art and the invention is to be limited only by the scope of the appended claims.

The embodiments of the invention in which an exclusive property or privilege is claimed are defined as follows:

1. A process or simultaneously dialkylating a 5α,6α-oxido-16 pregnen-20-one steroid compound comprising reacting said steroid compound with an alkyl metal halide having the formula R'M$_g$X, where R' is an alkyl group having from 1 to 8 carbon atoms and X is a halogen atom in the presence of a cuprous halide.

2. A process as defined in claim 1 in which said oxido steroid compound has the formula

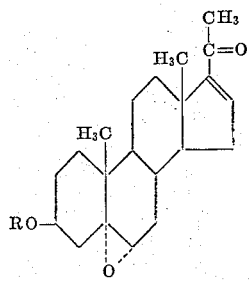

where R is selected from the group consisting of hydrogen and acyl radicals.

3. A process as defined in claim 1 in which said cuprous halide is cuprous chloride.

4. A process as defined in claim 1 in which said oxido steroid compound is 5α,6α-oxido-16-pregnen-3β-ol-20-one 3-acetate.

5. A process as defined in claim 1 wherein R' is methyl.

References Cited in the file of this patent

UNITED STATES PATENTS

| | | |
|---|---|---|
| 2,944,070 | Kollonitsch et al. | July 5, 1960 |
| 2,960,436 | Thomas et al. | Nov. 15, 1960 |

FOREIGN PATENTS

| | | |
|---|---|---|
| 801,201 | Great Britain | Sept. 10, 1958 |
| 802,005 | Great Britain | Sept. 24, 1958 |

OTHER REFERENCES

Derwent Belgian Report, No. 55A, page A22, June 30, 1959, Arth et al., 80 J.A.C.S., 3160 (1958).